(12) United States Patent  
Jaradi et al.

(10) Patent No.: US 12,233,808 B2
(45) Date of Patent: Feb. 25, 2025

(54) AIRBAG AND INFLATABLE DEVICE FOR VEHICLE

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US); Zhenyan Gao, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/336,073

(22) Filed: Jun. 16, 2023

(65) Prior Publication Data

US 2024/0416861 A1   Dec. 19, 2024

(51) Int. Cl.
| | |
|---|---|
| *B60R 21/213* | (2011.01) |
| *B60R 21/214* | (2011.01) |
| *B60R 21/231* | (2011.01) |
| *B60R 21/232* | (2011.01) |
| *B60R 21/233* | (2006.01) |
| *B60R 21/2338* | (2011.01) |

(52) U.S. Cl.
CPC .......... *B60R 21/213* (2013.01); *B60R 21/214* (2013.01); *B60R 21/232* (2013.01); *B60R 21/233* (2013.01); *B60R 21/2338* (2013.01); *B60R 2021/23161* (2013.01); *B60R 2021/23388* (2013.01)

(58) Field of Classification Search
CPC .......... B60R 2021/23107; B60R 2021/23153; B60R 2021/23161; B60R 2021/23386; B60R 2021/2338; B60R 21/213; B60R 21/214; B60R 21/232; B60R 21/233; B60R 21/2338
See application file for complete search history.

(56) References Cited

U.S. PATENT DOCUMENTS

| | | | |
|---|---|---|---|
| 6,308,982 B1 * | 10/2001 | Wallner ............... | B60R 21/2338 280/730.2 |
| 6,431,588 B1 * | 8/2002 | Bayley .................. | B60R 21/232 280/730.2 |
| 7,195,276 B2 * | 3/2007 | Higuchi ................ | B60R 21/231 280/743.1 |
| 8,562,018 B1 * | 10/2013 | Wantin .................. | B60R 21/232 280/730.2 |
| 9,327,669 B2 * | 5/2016 | Jaradi ..................... | B60R 21/08 |

(Continued)

*Primary Examiner* — Laura Freedman
(74) *Attorney, Agent, or Firm* — Frank A. MacKenzie; Bejin Bieneman PLC (57) ABSTRACT

A vehicle includes a vehicle roof and an airbag supported by the vehicle roof. The airbag is inflatable to an inflated position. The airbag defines an inflation chamber in the inflated position. The airbag includes a distal end below the vehicle roof in the inflated position. The vehicle includes an inflatable device supported by the vehicle roof. The inflatable device is a thermoplastic elastomer and inflatable to an inflated position. The inflatable device is in the inflation chamber of the airbag when the inflatable device and the airbag are in the inflated positions. The inflatable device includes a distal end in the inflation chamber of the airbag.

(Continued)

The distal end of the inflatable device is below the vehicle roof and above the distal end of the airbag in the inflated position.

19 Claims, 6 Drawing Sheets

(56) References Cited

U.S. PATENT DOCUMENTS

| | | | |
|---|---|---|---|
| 9,902,362 B2 | 2/2018 | Farooq et al. | |
| 9,925,950 B2* | 3/2018 | Moeller | B60R 21/239 |
| 9,994,182 B1 | 6/2018 | Jaradi et al. | |
| 10,065,592 B2 | 9/2018 | Jaradi et al. | |
| 10,336,283 B2* | 7/2019 | Rickenbach | B60R 21/233 |
| 10,407,018 B2* | 9/2019 | Sundararajan | B60R 21/2338 |
| 10,589,708 B2 | 3/2020 | Cho et al. | |
| 10,625,701 B2 | 4/2020 | Cho et al. | |
| 10,703,320 B2* | 7/2020 | Farooq | B60R 21/231 |
| 11,148,631 B2* | 10/2021 | Jaradi | B60R 21/205 |
| 11,214,227 B2* | 1/2022 | Jayakar | B60R 21/232 |
| 11,267,431 B2 | 3/2022 | Sekizuka | |
| 11,535,186 B2 | 12/2022 | Jaradi et al. | |
| 11,702,029 B1* | 7/2023 | Golman | B60R 21/2338 |
| | | | 280/743.2 |
| 11,958,430 B1* | 4/2024 | Faruque | B60R 21/232 |
| 2005/0104343 A1* | 5/2005 | Levine | B60R 21/232 |
| | | | 280/730.2 |
| 2022/0250573 A1 | 8/2022 | Jayakar et al. | |

* cited by examiner

AIRBAG AND INFLATABLE DEVICE FOR VEHICLE

BACKGROUND

It is anticipated that technology and regulatory framework may evolve in the future where a vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate between rides of the vehicle between forward-facing and rearward-facing positions.

Vehicles are equipped with airbags which act as supplemental restraints for occupants during certain vehicle impacts. The airbags are located at various fixed positions in passenger compartments of vehicles. Vehicles may include airbags supported on a dash, side air curtains mounted to the roof rails, side airbags mounted to seats, etc.

DETAILED DESCRIPTION

A vehicle includes a vehicle roof and an airbag supported by the vehicle roof. The airbag is inflatable to an inflated position. The airbag defines an inflation chamber in the inflated position. The airbag includes a distal end below the vehicle roof in the inflated position. The vehicle includes an inflatable device supported by the vehicle roof. The inflatable device is a thermoplastic elastomer and inflatable to an inflated position. The inflatable device is in the inflation chamber of the airbag when the inflatable device and the airbag are in the inflated positions. The inflatable device includes a distal end in the inflation chamber of the airbag. The distal end of the inflatable device is below the vehicle roof and above the distal end of the airbag in the inflated position.

The vehicle may include a vehicle body including the vehicle roof and a pyrotechnic retractor supported by the vehicle body. The pyrotechnic retractor may be operatively coupled to the distal end of the airbag to move the distal end of the airbag downwardly from the vehicle roof.

The vehicle body may include a vehicle floor and a pillar extending from the vehicle roof to the vehicle floor. The pyrotechnic retractor may be supported by the pillar.

The vehicle may include a tether extending from the pyrotechnic retractor to the distal end of the airbag.

The distal end of the inflatable device may be spaced above the distal end of the airbag.

The inflation chamber of the airbag may extend between the distal end of the inflatable device and the distal end of the airbag.

The airbag may be a woven fabric.

The inflation chamber of the inflatable device may be fluidly isolated from the inflation chamber of the airbag.

The vehicle may include two seats spaced from each other along a vehicle-longitudinal axis. The seats may face each other and the airbag and the inflatable device may be between the seats in the inflated position.

Each seat may define an occupant seating area. The airbag and the inflatable device may be between the occupant seating areas.

The inflation chamber of the airbag may be between the seats and the inflatable device along the vehicle-longitudinal axis in the inflated position.

The airbag may include a first impact panel and a second impact panel spaced from each other along a vehicle-longitudinal axis. The inflatable device may be between the first impact panel and the second impact panel along the vehicle-longitudinal axis in the inflated positions.

The inflation chamber of the airbag may extend between the first impact panel and the inflatable device and the inflation chamber of the airbag may extend between the second impact panel and the inflatable device.

The first impact panel and the second impact panel may be each concave.

The airbag may include a first side and a second side spaced along a cross-vehicle direction from the first side. The first side and the second side may each extend from the first impact panel to the second impact panel.

The inflatable device may extend along the cross-vehicle direction between the first side and the second side.

The inflatable device may be spaced from the first impact panel along the vehicle-longitudinal axis and the inflatable device may be spaced from the second impact panel along the vehicle-longitudinal axis when the inflatable device and the airbag are in the inflated positions.

The inflation chamber of the airbag may be between the distal end of the airbag and the distal end of the inflatable device.

The inflation chamber of the airbag may be between the inflatable device and the airbag.

With reference to the Figures, wherein like numerals indicate like parts throughout the several views, a vehicle 10 includes a vehicle roof 12 and an airbag 14 supported by the vehicle roof 12. The airbag 14 is inflatable to an inflated position. The airbag 14 defines an inflation chamber 16 in the inflated position. The airbag 14 includes a distal end 18 below the vehicle roof 12 in the inflated position. The vehicle 10 includes an inflatable device 20 supported by the vehicle roof 12. The inflatable device 20 is a thermoplastic elastomer and inflatable to an inflated position. The inflatable device 20 is in the inflation chamber 16 of the airbag 14 when the inflatable device 20 and the airbag 14 are in the inflated positions. The inflatable device 20 includes a distal end 22 in the inflation chamber 16 of the airbag 14. The distal end 22 of the inflatable device 20 is below the vehicle roof 12 and above the distal end 18 of the airbag 14 in the inflated position.

It is anticipated that technology and regulatory framework may evolve in the future where a vehicle 10 may include amenities that allow occupants to face one another during operation of the vehicle 10. In such examples, during certain vehicle impacts, the airbag 14 and the inflatable device 20 may move to the inflated positions to control the kinematics of occupants of seats 40 of the vehicle 10. The inflatable device 20 is in the inflation chamber 16 of the airbag 14 and acts as a reaction surface for the airbag 14 as the airbag 14 controls the kinematics of the occupants. In addition, occupants facing each other may provide reaction surfaces to the occupant that they are facing.

Figure 1:
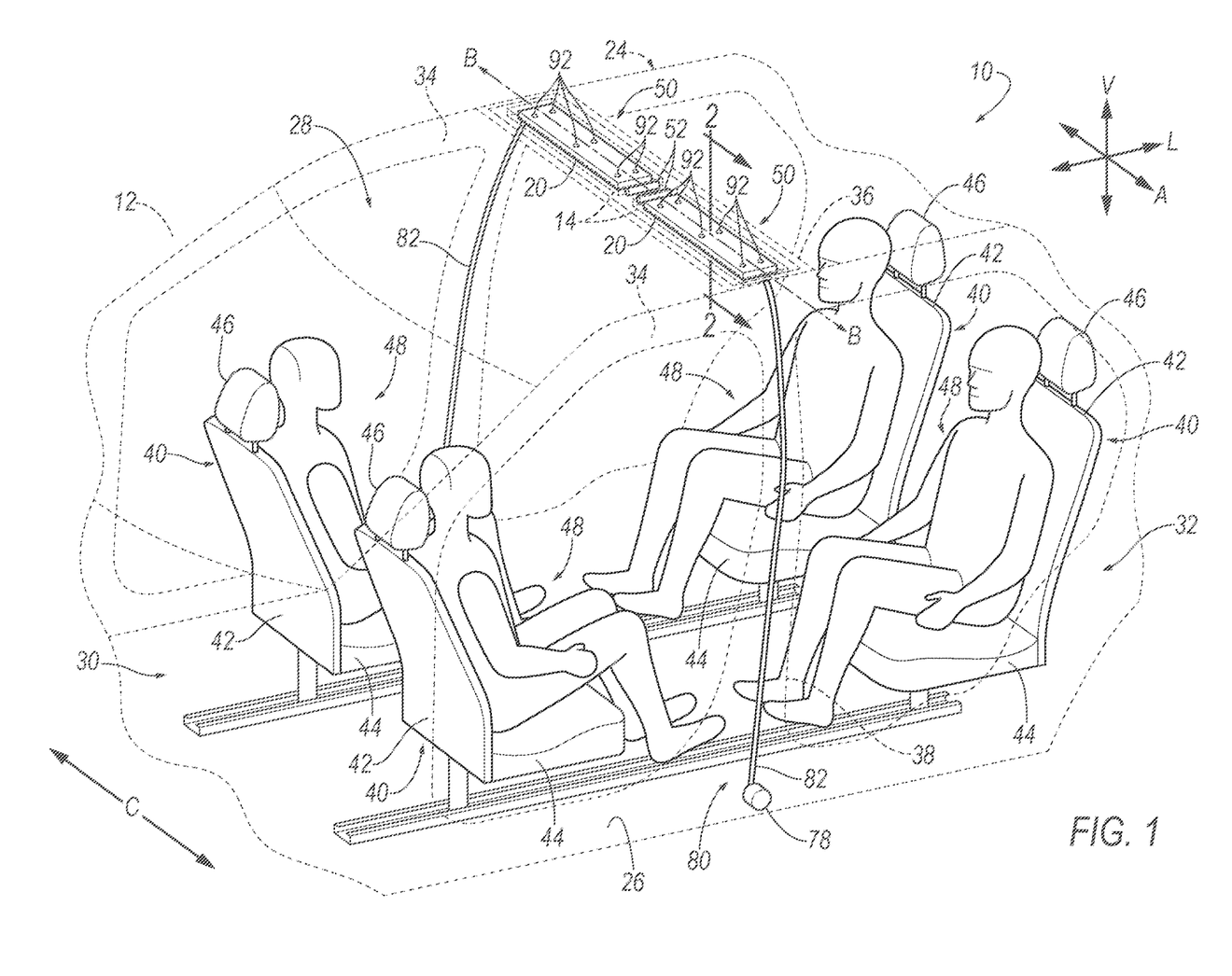
FIG. 1 is a perspective view of a vehicle having an airbag assembly supported by a vehicle roof.
Figure 3:
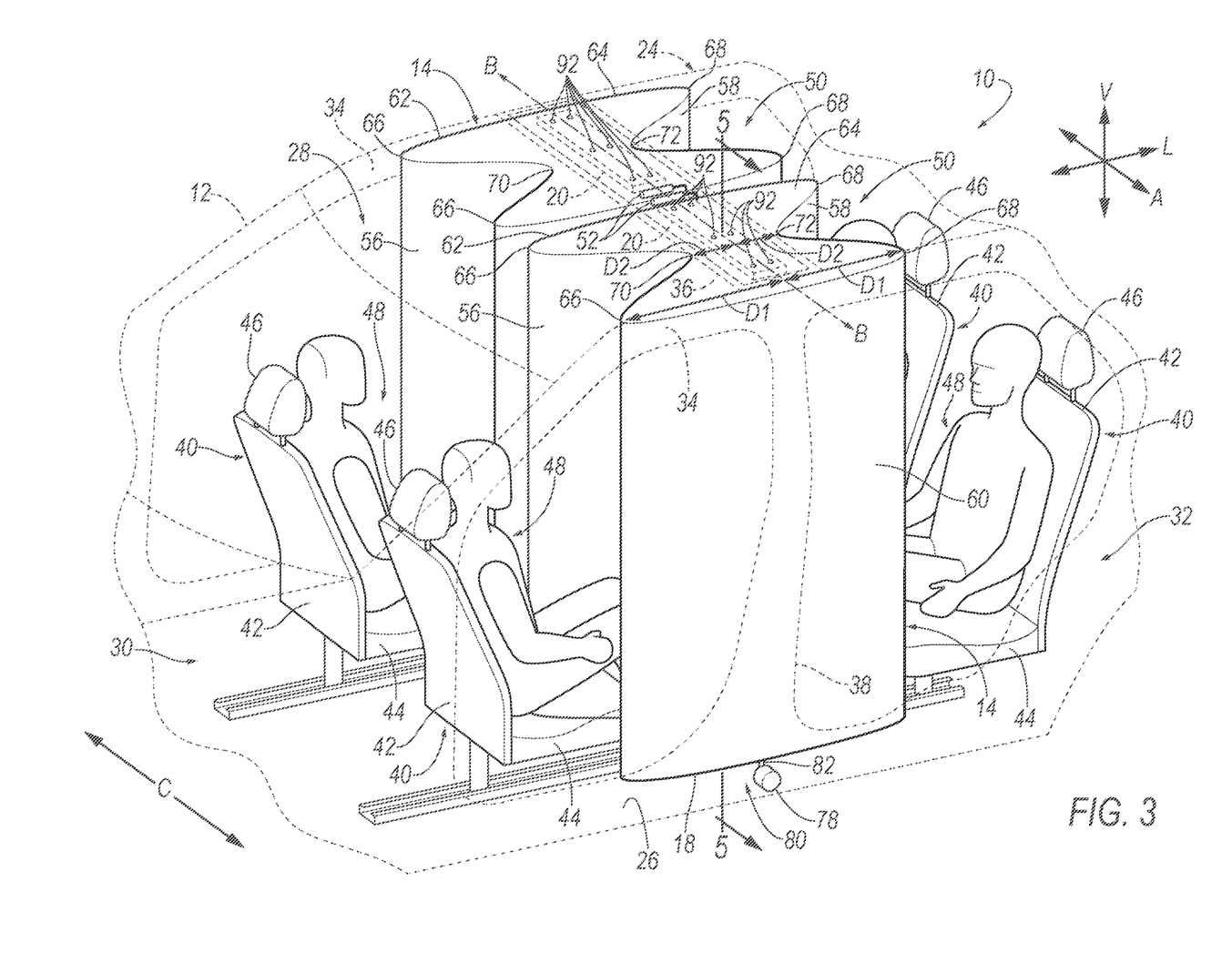
FIG. 3 is a perspective view of the vehicle with an airbag and an inflatable device of the airbag assembly is in an inflated position.
Figure 4:
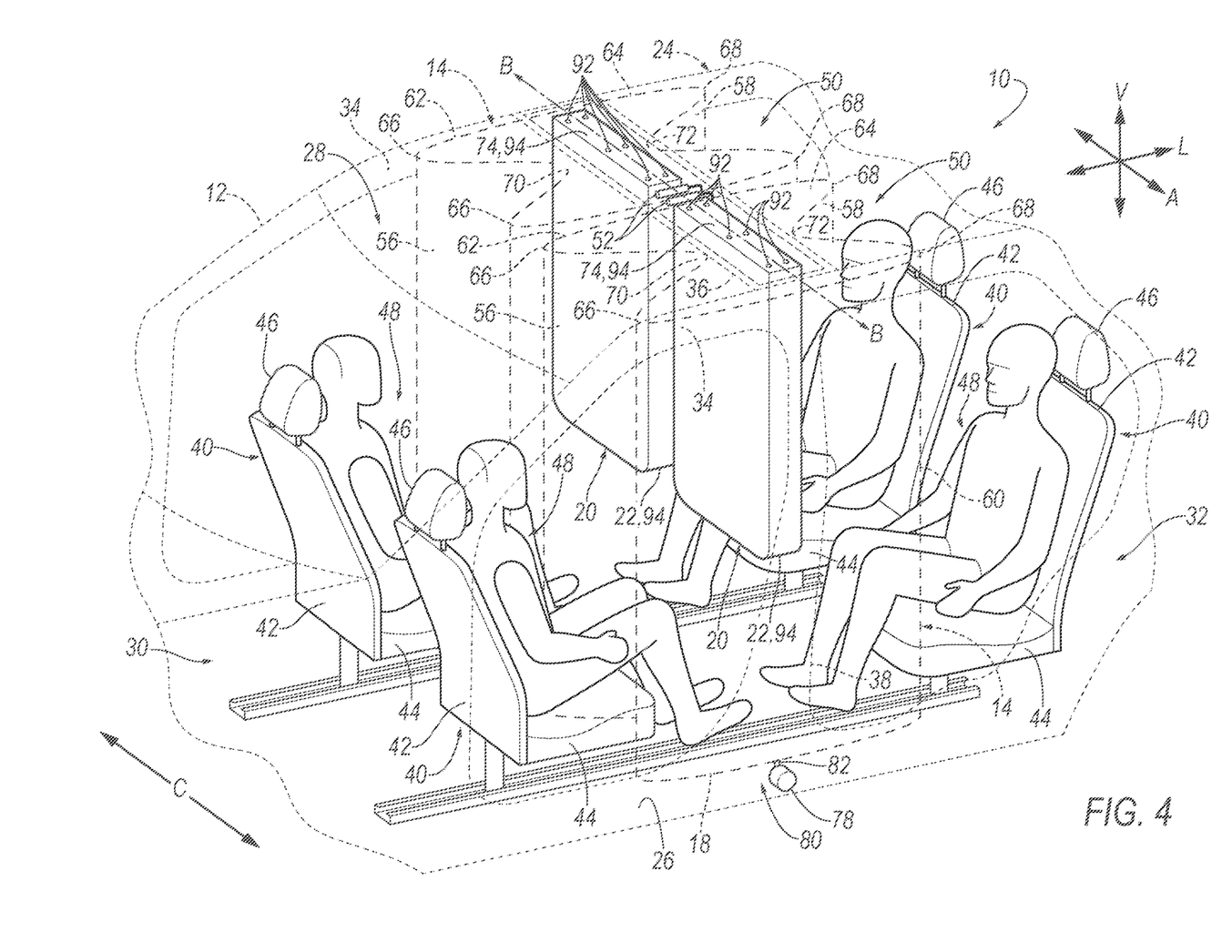
FIG. 4 is a perspective view of the vehicle with the airbag and the inflatable device of the airbag assembly are in inflated positions.

With reference to FIGS. 1, 3, and 4, the vehicle 10 may be any suitable type of automobile, e.g., a passenger or commercial automobile such as a sedan, a coupe, a truck, a sport utility, a crossover, a van, a minivan, a taxi, a bus, etc. Operations, systems, and methods described herein should always be implemented and/or performed in accordance with an applicable owner's/user's manual and/or safety guidelines.

The vehicle 10 defines a vehicle-longitudinal axis L extending between a front vehicle end (not numbered) and a rear vehicle end (not numbered) of the vehicle 10. The vehicle defines a cross-vehicle axis A extending cross-vehicle from one side to the other side of the vehicle 10. A cross-vehicle direction C is parallel to the cross-vehicle axis A. The vehicle defines a vertical axis V. The vehicle-longitudinal axis L, the cross-vehicle axis A, and the vertical axis V are perpendicular relative to each other.

As described further below, the vehicle 10 includes a vehicle body 24 including rockers (not numbered), roof rails 34, roof beams 36, pillars, body panels (not numbered), a vehicle floor 26, the vehicle roof 12, etc. The vehicle 10 includes a passenger compartment 28 to house occupants, if any, of the vehicle 10. The passenger compartment 28 may extend across the vehicle 10, i.e., from one side to the other side of the vehicle 10. The passenger compartment 28 includes a front end 30 and a rear end 32 with the front end 30 being in front of the rear end 32 during forward movement of the vehicle 10.

The vehicle body 24, specifically, the vehicle roof 12, includes at least two roof rails 34. The roof rails 34 are cross-vehicle spaced from each other along the cross-vehicle axis A and are generally parallel to each other in the cross-vehicle direction C. The roof rails 34 each extend longitudinally along the vehicle body 24, i.e., along the vehicle-longitudinal axis L of the vehicle body 24. The vehicle body 24 may include any suitable number of roof rails 34 spaced from one another and extending longitudinally along the vehicle body 24.

The vehicle body 24, specifically, the vehicle roof 12, includes at least one roof beam 36. The roof beam 36 extends from one roof rail 34 to the other roof rail 34. The roof beam 36 is irremovably fixed to both roof rails 34. In other words, the roof beam 36 is secured to the roof rails 34 in such a way that removal requires destruction such as cutting, e.g., cutting material and/or welded joints, etc. As an example, the roof beam 36 may be attached to both roof rails 34, e.g., by welding, fasteners, etc. In addition to the at least one roof beam 36, the vehicle body 24 may include any suitable number of roof beams 36 spaced from one another and extending from one roof rail 34 to the other roof rail 34.

With continued reference to FIGS. 1, 3, and 4, the vehicle roof 12 and the vehicle floor 26 are spaced from each other. Specifically, the vehicle floor 26 is spaced downwardly from the vehicle roof 12. The vehicle roof 12 defines the upper boundary of the passenger compartment 28 and may extend from the front end 30 of the passenger compartment 28 to the rear end 32 of the passenger compartment 28. The vehicle roof 12 may include a roof panel (not numbered) extending from one roof rail 34 to the other roof rail 34. The roof panel may be irremovably fixed to the roof rails. In other words, the roof panel is secured to the roof rails in such a way that removal requires destruction such as cutting, e.g., cutting material and/or welded joints, etc. As an example, the roof panel may be attached to both roof rails, e.g., by welding, fasteners, etc.

The vehicle 10 includes the vehicle floor 26 defining the lower boundary of the passenger compartment 28 and may extend from the front end 30 of the passenger compartment 28 to the rear end 32 of the passenger compartment 28. The vehicle floor 26 may include upholstery, for example, carpet, and may have a class-A surface facing the passenger compartment 28, i.e., a surface specifically manufactured to have a high quality, finished, aesthetic appearance free of blemishes.

The vehicle 10 may include a headliner (not shown) that may be supported by the vehicle body 24, specifically, the vehicle roof 12, underneath the roof panel. The headliner may conceal the vehicle roof 12, from view inside the vehicle 10, i.e., in the passenger compartment 28 of the vehicle 10. The headliner includes a class-A surface facing the passenger compartment 28. i.e., a surface specifically manufactured to have a high quality, finished, aesthetic appearance free of blemishes. The headliner may be, for example, a polymeric panel that spans the vehicle roof 12. As an example, the headliner may include polyurethane foam.

The vehicle body 24 may include vehicle pillars (not all numbered) spaced from each along the vehicle-longitudinal axis L on both sides of the vehicle body 24. Specifically, in the example shown in the Figures, the vehicle body 24 includes a front pillar (not numbered), a middle pillar 38 spaced vehicle-rearward from the front pillar, and a rear pillar (not numbered) spaced vehicle-rearward from the middle pillar 38. The vehicle 10 includes a set of vehicle pillars on each side of the vehicle body 24. For example, the vehicle body 24 includes a front pillar, a middle pillar 38, and a rear pillar on each side of the vehicle 10 with the vehicle pillars being spaced from each other along the vehicle-longitudinal axis L. In other words, the front pillar may be disposed at the front end 30 of the passenger compartment 28, the rear pillar may be disposed at the rear end 32 of the passenger compartment 28, and the middle pillar 38 between the front pillar and the rear pillar. The vehicle pillars on both sides of the vehicle 10 may extend from the vehicle roof 12 to the vehicle floor 26 to support the vehicle roof 12. The vehicle may include other vehicle pillars in addition to the front pillar, the middle pillar 38, and the rear pillar.

With continued reference to FIGS. 1, 3, and 4, the vehicle 10 may include a plurality of seats 40. Specifically, the vehicle 10 may include any suitable number of seats 40. In the example shown in the Figures, the vehicle 10 may include two rows of two seats 40 that face each other. The rows face each other and are spaced from each other along the vehicle-longitudinal axis L. In other words, the vehicle 10 includes two seats 40 facing each other on a right side of the passenger compartment 28 that are spaced from each other along the vehicle-longitudinal axis L and two seats 40 facing each other on a left side of the passenger compartment 28 that are spaced from each other along the vehicle-longitudinal axis L. The roof beam 36, as shown in the Figures, may be between the two rows of seats 40 along the vehicle-longitudinal axis L.

The seats 40 are supported by the vehicle floor 26. The seats 40 may be arranged in any suitable arrangement in the passenger compartment 28. As in the example shown in the Figures, one or more of the seats 40 may be at the front end 30 of the passenger compartment 28, e.g., a first row. In other examples, one or more of the seats 40 may be behind the front end 30 of the passenger compartment 28, e.g., a second row. The seats 40 may be movable relative to the vehicle floor 26 to various positions, e.g., movable fore-and-aft and/or cross-vehicle. The seat 40 may be of any suitable type, e.g., a bucket seat.

The seats 40 include a seatback 42, a seat bottom 44, and a head restraint 46. The head restraint 46 may be supported by and extend upwardly from the seatback 42. The head restraint 46 may be stationary or movable relative to the seatback 42. The seatback 42 may be supported by the seat bottom 44 and may be stationary or movable relative to the seat bottom 44. The seatback 42, the seat bottom 44, and the head restraint 46 may be adjustable in multiple degrees of freedom. Specifically, the seatback 42, the seat bottom 44, and the head restraint 46 may themselves be adjustable. In other words, adjustable components within the seatback 42, the seat bottom 44, and the head restraint 46 may be adjustable relative to each other.

The seatback 42 includes the seat frame (not shown) and a covering (not numbered) supported on the seat frame. The seat frame may include tubes, beams, etc. Specifically, the seat frame includes a pair of upright frame members (not shown). The upright frame members are elongated, and specifically, are elongated in a generally upright direction when the seatback 42 is in a generally upright position. The upright frame members are spaced from each other and the seat frame includes one or more cross-members (not shown) extending between the upright frame members. The seat frame, including the upright frame members, may be of any suitable plastic material, e.g., carbon fiber reinforced plastic (CFRP), glass fiber-reinforced semi-finished thermoplastic composite (organosheet), etc. As another example, some or all components of the seat frame may be formed of a suitable metal, e.g., steel, aluminum, etc.

The covering may include upholstery, padding, and/or plastic portions. The upholstery may be cloth, leather, faux leather, or any other suitable material. The upholstery may be stitched in panels around the seat frame. The padding may be between the covering and the seat frame and may be foam or any other suitable material.

The seats 40 each define an occupant seating area 48. Specifically, the seatback 42 and the seat bottom 44 of each seat 40 define the occupant seating areas 48 of the seats 40. The occupant seating area 48 is the area occupied by an occupant when properly seated on the seat bottom 44 and the seatback 42. The occupant seating area 48 is in a seat-forward direction of the seatback 42 and above the seat bottom 44. In the example shown in the Figures, the occupant seating area 48 faces the front end 30 of the passenger compartment 28 when the seat 40 is in a forward-facing position and the occupant seating area 48 faces the rear end 32 of the passenger compartment 28 when the seat 40 is in a rearward-facing position.

With reference to FIGS. 1-5, the vehicle 10 may include one or more airbag assemblies 50. The airbag assembly 50 includes the airbag 14, the inflatable device 20, and an inflator 52. The airbag assemblies 50 are supported by the vehicle roof 12. The airbag assemblies 50 are supported by one or more roof beams 36 of the vehicle 10. Specifically, the airbag assemblies 50 are fixed relative to the vehicle roof 12, i.e., the airbag assemblies 50 are fixed to one or more of the roof beams 36 of the vehicle 10. The vehicle 10 may include any suitable number of airbag assemblies 50. As an example, the airbag assembly 50 may be fixed to a mounting plate 54 that is fixable to the vehicle roof 12, specifically, one of the roof beams 36. The mounting plate 54 may be fixed to the vehicle roof 12, e.g., the roof beams 36, in any suitable way, e.g., threaded fasteners, brackets, clips, etc. The mounting plate 54 may be rigid relative to the airbag 14 and the inflatable device 20. The mounting plate 54 may be, for example, metal, plastic, etc. The mounting plate 54 may be elongated along an axis B that extends along the cross-vehicle direction C. In other examples, the airbag assembly 50 may be fixed directly to the roof beam 36.

The vehicle 10 may include any suitable number of airbag assemblies 50. As one example and as shown in the Figures, the vehicle 10 may include two airbag assemblies 50 adjacent each other in the cross-vehicle direction C. In other words, the two airbag assemblies 50 in the Figures are fixed adjacent to each other on one of the roof beams 36. In examples including more than one airbag assembly 50, the airbag assemblies 50 may be identical or substantially identical to each other. In other words, common element numerals indicate identical portions of each of the airbag assemblies 50.

The inflator 52 is fluidly connected to the airbag 14 and the inflatable device 20. The inflator 52 expands the airbag 14 and the inflatable device 20 with inflation medium, such as a gas, to move the airbag 14 and the inflatable device 20 from uninflated positions to inflated positions. The inflator 52 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 52 may be fluidly connected to the airbag 14 and the inflatable device 20 by one or more fill tubes or other suitable connections to fluidly communicate with the airbag 14 and the inflatable device 20.

As discussed above, the airbag assembly 50 is fixed relative to the vehicle roof 12. Specifically, the airbag 14 and the inflatable device 20 are fixed relative to the vehicle roof 12. The airbag 14 and the inflatable device 20 may be fixed to the mounting plate 54 to be fixed to the vehicle roof 12. In other words, the airbag 14 and the inflatable device 20 are fixed to one of the roof beams 36 of the vehicle 10. The airbag 14 and the inflatable device 20 may be fixed to the mounting plate 54 to be fixed to the roof beam 36 of the vehicle 10. In the uninflated position, the airbag assembly 50 is elongated along the axis B in the cross-vehicle direction C. As an example, the airbag 14 and the inflatable device 20 may be fixed to the mounting plate 54 in any suitable way.

The airbag 14 and the inflatable device 20 are fluidly isolated from each other. In other words, inflation medium does not freely pass between the airbag 14 and the inflatable device 20. Inflation medium passes directly from the inflator 52 to the airbag 14 and directly from the inflator 52 to the inflatable device 20. After inflation medium passes into each of the airbag 14 and the inflatable device 20, there are no fluid communication of the inflation medium between the airbag 14 and the inflatable device, e.g., no valves or holes between the inflatable device 20 and the airbag 14 that would allow flow therebetween.

With reference to FIG. 1, in the uninflated positions, the airbag 14 and the inflatable device 20 may be folded in such a way that the airbag 14 and the inflatable device 20 are concealed from the passenger compartment 28. The airbag 14 and the inflatable device 20 may be between the vehicle roof 12, e.g., the roof beam 36, and the headliner of the vehicle 10. The airbag 14 and the inflatable device 20 may be folded, e.g., in an accordion fold pattern, when the airbag 14 and the inflatable device 20 are in the uninflated positions. In the uninflated position, the inflatable device 20 is inside the airbag 14. As discussed further below, the inflatable device 20 is inside the inflation chamber 16 of the airbag 14. As the airbag 14 and the inflatable device 20 move to the inflated position, the headliner may include a releasable tear seam (not shown) to allow the airbag 14 and the inflatable device 20 to unfold and move to the inflated positions.

Figure 5:
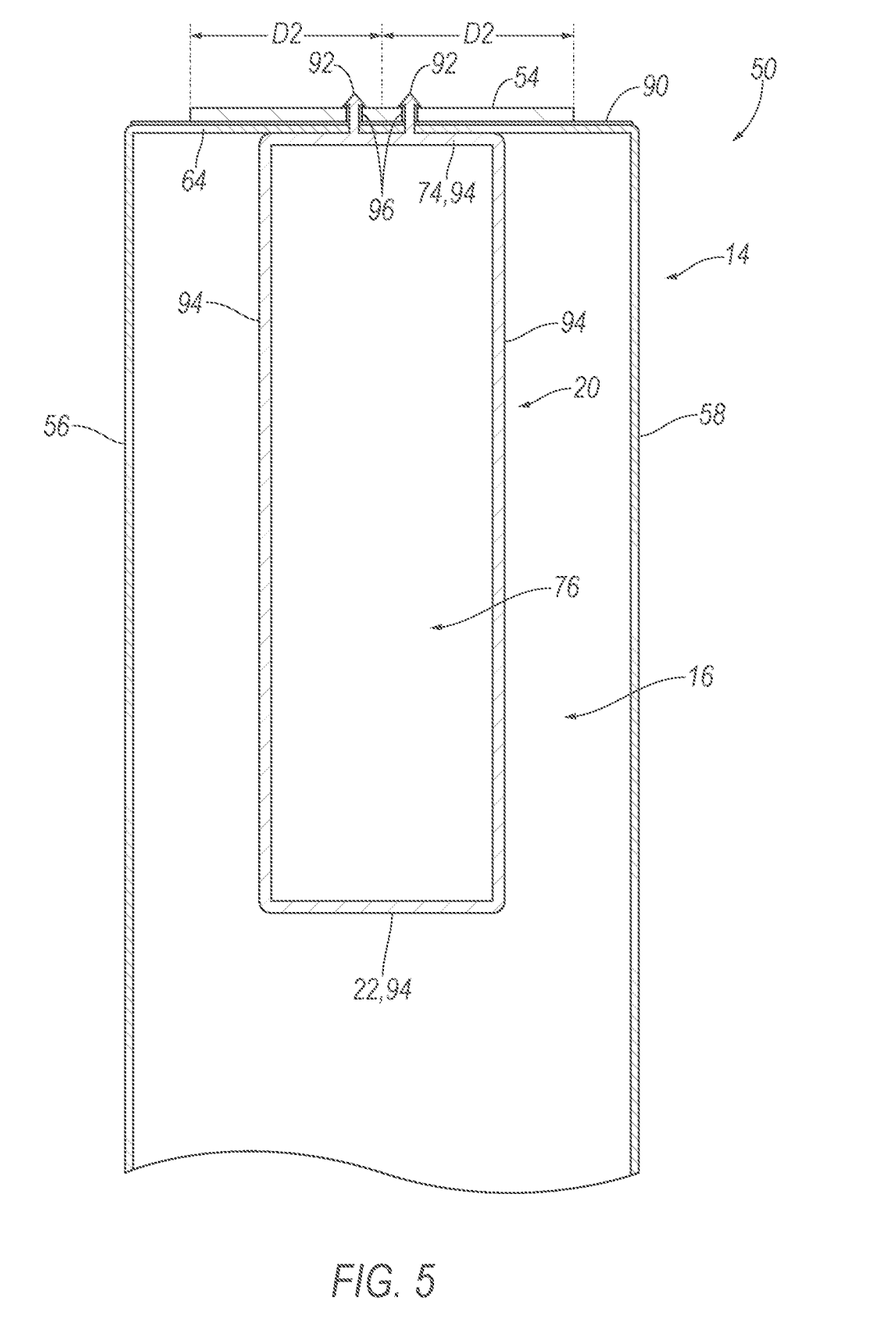
FIG. 5 is a cross-sectional view through line 5 of FIG. 3.

The airbag 14 includes a first impact panel 56, a second impact panel 58, a first side 60, and a second side 62. In the inflated position, as shown in FIGS. 3-5, the first impact panel 56 and the second impact panel 58 are spaced from each other along the vehicle-longitudinal axis L. The first impact panel 56 and the second impact panel 58 may each face opposite directions from each other along the vehicle-longitudinal axis L. In other words, the first impact panel 56 and the second impact panel 58 each face toward one of the seats 40 spaced along the vehicle-longitudinal axis L.

The first side 60 and the second side 62 of the airbag 14 are spaced from each other in the cross-vehicle direction C. In other words, the second side 62 is spaced from the first side 60 along the cross-vehicle direction C when the airbag 14 is in the inflated position. One of the first side 60 and the second side 62 is vehicle-inboard of the other of the first side 60 and the second side 62. In other words, one of the first side 60 and the second side 62 may be spaced vehicle-inboard of the other of the first side 60 and the second side 62. Each of the first side 60 and the second side 62 each extend from the first impact panel 56 to the second impact panel 58. In other words, the first impact panel 56 is spaced from the second impact panel 58 by the first side 60 and the second side 62. The first side 60 and the second side 62 are elongated along the vehicle-longitudinal axis L.

The airbag 14 extends downwardly from the vehicle roof 12 in the inflated position. Specifically, the airbag 14 includes a proximal end 64 and the distal end 18 spaced downwardly from the proximal end 64. The proximal end 64 of the airbag 14 is fixed relative to the roof and the distal end 18 is spaced below the vehicle roof 12 in the inflated position. As the airbag 14 inflates to the inflated position, the distal end 18 moves away from the vehicle roof 12 and the proximal end 64 toward the vehicle floor 26 until the airbag 14 reaches the inflated position.

The first impact panel 56, the second impact panel 58, the first side 60, and the second side 62 define an outer periphery (not numbered) of the airbag 14. In other words, the first impact panel 56, the second impact panel 58, the first side 60, and the second side 62 define the inflation chamber 16 of the airbag 14. The inflation chamber 16 may define the entire volume of the airbag 14 that fills with inflation medium. In the event of certain vehicle impacts, the inflation chamber 16 of the airbag 14 is filled with inflation medium by the inflator 52 to control the kinematic of the occupants of the seats 40.

The first impact panel 56 includes a pair of first ends 66 and the second impact panel 58 includes a pair of second ends 68. The first side 60 extends from one of the first ends 66 to one of the second ends 68 and the second side 62 extends from the other of the first ends 66 to the other of the second ends 68. The first ends 66 and the second ends 68 are each spaced from the axis B along the vehicle-longitudinal axis L by a first distance D1. The first impact panel 56 includes a middle 70 between the first ends 66 along the first impact panel 56. The second impact panel 58 includes a middle 72 between the second ends 68 along the second impact panel 58. The middles 70, 72 are each spaced from the axis B by a second distance D2 that is less than the first distances D1. In other words, the middles 70, 72 are closer in proximity to the middles 70, 72 than the first ends 66 and the second ends 68.

With reference to FIGS. 3 and 4, the first impact panel 56 and the second impact panel 58 are each concave. In other words, the first impact panel 56 and the second impact panel 58 are each curved between the first ends 66 and between the second ends 68. The first impact panel 56 curves from each of the first ends 66 toward the middle 70 of the first impact panel 56 such that the middle 70 is closer to the axis B than the first ends 66 as discussed above. The second impact pane curves from each of the second ends 68 toward the middle 72 of the second impact panel 58 such that the middle 72 is closer to the axis B than the second ends 68 as discussed above. In other words, the first impact panel 56 and the second impact panel 58 are generally U-shaped between the first ends 66 and the second ends 68.

The airbag 14 may be a woven fabric, e.g., a woven polymer. For example, the fabric may be woven nylon yarn, for example, nylon 6, 6. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

The inflatable device 20 is supported by the vehicle roof 12 in the uninflated position and in the inflated position. In other words, the weight of the inflatable device 20 is borne by the vehicle roof 12 in the uninflated position and the inflated position. The inflatable device 20 supports the airbag 14 on the vehicle roof 12, i.e., the weight of the airbag 14 is borne by the inflatable device 20, in the uninflated position and the inflated position, as described further below. The inflatable device 20 is fixed relative to the vehicle roof 12. For example, in the example shown in the Figures, the inflatable device 20 is fixed to the mounting plate 54 and the mounting plate 54 is fixed to the roof beam 36 of the vehicle roof 12. In both the uninflated position and the inflated position, the inflatable device 20 extends along the vehicle roof 12. Specifically, the inflatable device 20 extends along the axis B in the cross-vehicle direction C. The inflatable device 20 may extend in the cross-vehicle direction C along the roof beam 36 of the vehicle roof 12.

Figure 2:
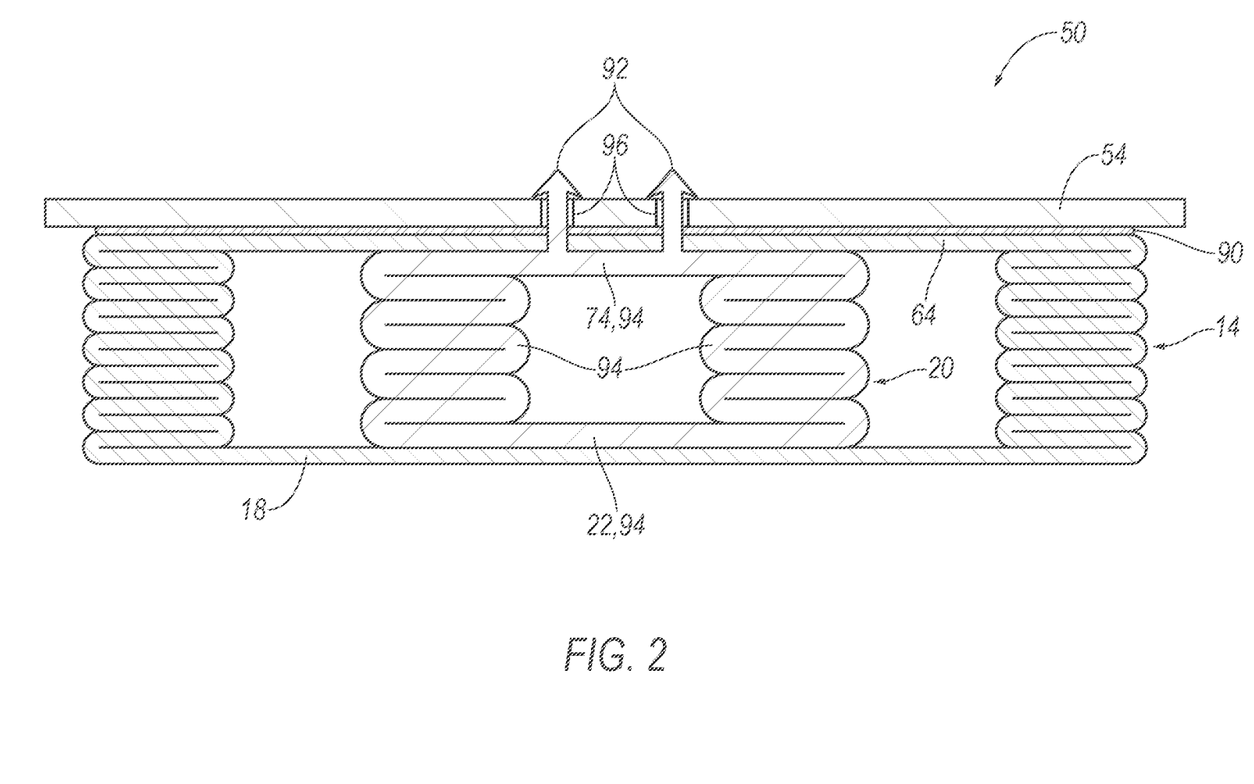
FIG. 2 is a cross-sectional view through line 2 of FIG. 1.

With reference to FIGS. 2 and 5, the inflatable device 20 is inside the airbag 14. In other words, when the airbag 14 and the inflatable device 20 are in the inflated positions, the inflatable device 20 is inside the inflation chamber 16 of the airbag 14. The distal end 22 of the inflatable device 20 is inside the airbag 14. Specifically, the distal end 22 of the inflatable device 20 is spaced downwardly from the vehicle roof 12 and spaced upwardly from the distal end 18 of the airbag 14. Specifically, the distal end 22 of the inflatable device 20 is below the vehicle roof 12 and above the distal end 18 of the airbag 14. In other words, the distal end 22 of the inflatable device 20 is between the vehicle roof 12 and the distal end 18 of the airbag 14 along the vertical axis V of the vehicle 10. The inflation chamber 16 of the airbag 14 may be between the distal end 22 of the inflatable device 20 and the distal end 18 of the airbag 14.

The inflatable device 20 includes the distal end 22 and a proximal end 74. The proximal end 74 is fixed to the mounting plate 54 that is fixed to the vehicle roof 12 and the distal end 22 is below the vehicle roof 12. The inflatable device 20 extends downwardly from the vehicle roof 12 to the distal end 22. The inflatable device 20 may be elongated along the vertical axis V of the vehicle 10 from the proximal end 74 to the distal end 22. The distal end 22 is spaced downwardly from the vehicle roof 12 and the proximal end 74 of the inflatable device 20. The distal end 22 may be spaced upwardly from the vehicle floor 26.

The inflatable device 20 includes walls 94 defining an inflation chamber 76 of the inflatable device 20. The walls 94 may include the distal end 22 and the proximal end 74 of the inflatable device 20. The inflatable device 20 may include one or more fasteners 92 that engage the inflatable device 20 to the vehicle roof 12, e.g., engaged with the mounting plate 54 that is fixed to the vehicle roof 12. The fasteners 92 may be unitary with one of the walls 94 of the inflatable device 20, i.e., a single, uniform piece of material with no seams, joints, fasteners, or adhesives holding them together. As shown in the example in the Figures, the fasteners 92 may be Christmas tree fasteners unitary with the proximal end 74 if the inflatable device 20. The fasteners 92 are engageable with holes 96 in the mounting plate 54. In other examples, the fasteners 92 may be any suitable type of fastener to engage the inflatable device 20 with the vehicle roof 12, e.g., clips, fasteners, etc. In some examples, in addition to or in the alternative to the fasteners, the inflatable device 20 may be adhered to the mounting plate 54 with an adhesive 90. Any combination of fasteners 92 and adhesive 90 may be used to secure the inflatable device 20 to the vehicle roof 12.

The inflatable device 20 may be a thermoplastic elastomer. The thermoplastic elastomer (TPE) of the inflatable device 20 is inflatable from the uninflated position to the inflated position. Specifically, the walls 94 of the inflatable device 20 are thermoplastic elastomer. The walls 94 of the inflatable device 20 define the inflation chamber 76 of the inflatable device 20. The inflation chamber 76 is supplied with inflation medium from the inflator 52 to inflate the inflatable device 20 and deploy the inflatable device 20 from the uninflated position to the inflated position. Specifically, the walls 94 of the inflatable device 20 are solid, i.e., not woven, fabric, sewn, etc. The wall 94 thickness of the inflatable device 20 may be, for example, 1-3 mm. In the uninflated position, one or more of the walls 94 of the inflatable device 20 may be flat and one or more of the walls 94 may be folded. The walls 94 that are folded unfold to allow the inflatable device 20 to expand from the uninflated position to the inflated position. The folded wall 94 may be accordion-shaped, as described above, in the uninflated position. The wall 94 thickness of the walls 94 of the inflatable device 20 may remain generally constant from the uninflated position to the inflated position, e.g., with little or no stretch.

The inflatable device 20 may be of any suitable TPE, e.g., styrenic block copolymers, thermoplastic olefins, elastomeric alloys, thermoplastic polyurethanes, thermoplastic copolyesters, and thermoplastic polyamides. The inflatable device 20 may be formed using any suitable manufacturing process, e.g., injection molding, blow molding, ultrasonic welding, etc. Specifically, the walls 94 of the inflatable device 20 may be unitary with each other, i.e., a single, uniform piece of material with no seams, joints, fasteners, or adhesives holding the walls together, i.e., formed together simultaneously as a single continuous unit. In other examples, the walls of the inflatable device 20 may be non-unitary components, i.e., formed separately and subsequently assembled, e.g., by, welding, adhesive, etc.

The inflatable device 20 may be spaced from the airbag 14 inside the inflation chamber 16 of the airbag 14. In other words, the inflatable device 20 is spaced from the first impact panel 56, the second impact panel 58, the first side 60, and the second side 62. The inflation chamber 16 of the airbag 14 is between the inflatable device 20 and the airbag 14. In other words, the inflation chamber 16 of the airbag 14 is around the inflatable device 20. Specifically, the inflation chamber 16 of the airbag 14 is between the inflatable device 20 and the first impact panel 56, the second impact panel 58, the first side 60, and the second side 62. The inflatable device 20 is spaced from the first impact panel 56 and the second impact panel 58 along the vehicle-longitudinal axis L. Specifically, the inflatable device 20 is between the first impact panel 56 and the second impact panel 58 along the vehicle-longitudinal axis L. In other words, the inflation chamber 16 of the airbag 14 is between the inflatable device 20 and each of the impact panels 56, 58 in the inflated position along the vehicle-longitudinal axis L. The inflatable device 20 extends in the cross-vehicle direction C between the first side 60 of the airbag 14 and the second side 62 of the airbag 14. Specifically, the inflatable device 20 is spaced from the sides of the airbag 14 in the cross-vehicle direction C. In other words, the inflation chamber 16 of the airbag 14 is between the inflatable device 20 and the sides of the airbag 14.

The inflatable device 20 defines the inflation chamber 76 between the distal end 22 and the proximal end 74. In the event of certain vehicle impacts, the inflatable device 20 inflates to the inflated position simultaneously with the airbag 14. The inflator 52 passes inflation medium separately into the inflation chamber 16 of the airbag 14 and into the inflation chamber 76 of the inflatable device 20 to move the airbag 14 and the inflatable device 20 to the inflated positions.

With reference to FIGS. 3 and 4, in the inflated position, the airbag 14 and the inflatable device 20 are between the rows of seats 40. In other words, the airbag 14 and the inflatable device 20 are between two seats 40 that face each other. Specifically, the airbag 14 and the inflatable device 20 are between the occupant seating areas 48 of the seats 40 along the vehicle-longitudinal axis L in the inflated position. The inflation chamber 16 of the airbag 14 is between the seats 40 and the inflatable device 20. In the event of certain vehicle impacts, the airbag 14 and the inflatable device 20 may control the kinematics of occupants of the seats 40 that face each other. The inflatable device 20 may provide a reaction surface for the airbag 14 to control the kinematics of occupants of the seats 40 in the event of certain vehicle impacts.

With reference to FIGS. 1, 3, and 4, the vehicle 10 includes a pyrotechnic retractor 78 supported by the vehicle body 24. Specifically, the pyrotechnic retractor 78 is fixed to the vehicle body 24. The pyrotechnic retractor 78 is supported by the middle pillar 38. Specifically, the pyrotechnic retractor 78 is fixed at a base 80 of the middle pillars 38 of the vehicle 10. For example, the pyrotechnic retractor 78 is fixed adjacent the vehicle floor 26 on the middle pillar 38.

The pyrotechnic retractor 78 is operatively coupled to the airbag 14 to move the distal end 18 of the airbag 14 downwardly from the vehicle roof 12. In other words, the pyrotechnic retractor 78 is operatively coupled to the airbag 14 to move the distal end 18 of the airbag 14 toward the vehicle floor 26. The pyrotechnic retractor 78 is coupled to the airbag 14 in such a way that the pyrotechnic retractor 78 moves the distal end 18 of the airbag 14 toward the vehicle floor 26 as the airbag 14 moves to the inflated position. In the event of certain vehicle impacts, the airbag 14 moves to the inflated position and the pyrotechnic retractor 78 activates to move the distal end 18 toward the vehicle floor 26.

A tether 82 may extend from the pyrotechnic retractor 78 to the airbag 14. Specifically, the tether 82 extends from the pyrotechnic retractor 78 to the distal end 18 of the airbag 14. The tether 82 is retractable by the pyrotechnic retractor 78 to move the distal end 18 of the airbag 14 downwardly from the roof. When the airbag 14 is in the uninflated position, the tether 82 may be routed along the middle pillar 38 to the airbag 14 when the airbag 14 is concealed by the headliner. During certain vehicle impacts, the airbag 14 and the inflatable device 20 moves toward the inflated position and the pyrotechnic retractor 78 activates to retract the tether 82. In the inflated position, the tether 82 is retracted along the middle pillar 38. A trim panel (not shown) of the middle pillar 38 may include a tear seam (not shown) that releases to allow the tether 82 to retract and the airbag 14 move to the inflated position.

The pyrotechnic retractor 78 may include a pyrotechnic charge that activates to move the distal end 18 of the airbag 14 downwardly from the vehicle roof 12. The pyrotechnic charge may be combustible to produce a gas. The pyrotechnic charge may be formed of a solid mixture of substances that, when ignited, react to produce the gas. For example, the pyrotechnic charge may be formed of sodium azide (NaNO3), potassium nitrate (KNO3), and silicon dioxide (SiO2), which react to form nitrogen gas (N2).

The pyrotechnic retractor 78 may be any suitable type such as a rotary retractor, in which the pyrotechnic charge rotates a shaft connected to the tether 82 such that the tether 82 wraps around the shaft; a piston linkage, in which the pyrotechnic charge for example, drives a piston attached to the tether 82; a ball-in-tube linkage, in which an pyrotechnic charge propels a ball or balls over a cogwheel connected to the tether 82; a mechanical linkage, in which a compressed spring attached to the tether 82 is released; or any other suitable type.

Figure 6:
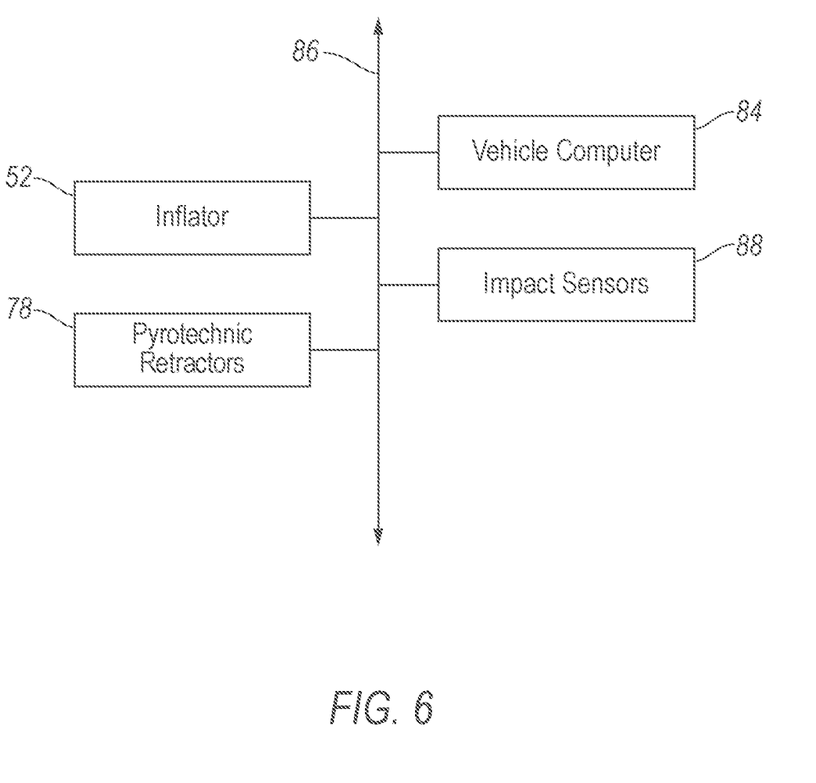
FIG. 6 is a block diagram of a vehicle communication network of the vehicle.

With reference to FIG. 6, the vehicle 10 may include a vehicle computer 84 including a processor and a memory storing instructions executable by the processor. The memory includes one or more forms of computer readable media, and stores instructions executable by the vehicle computer 84 for performing various operations, including as disclosed herein. The vehicle computer 84 may be a restraints control module. The vehicle computer 84 can be a generic computer with the processor and the memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the vehicle computer 84 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 84.

The vehicle computer 84 is generally arranged for communications on a vehicle communication network 86 that can include a bus in the vehicle 10 such as a controller area network CAN or the like, and/or other wired and/or wireless mechanisms. Alternatively or additionally, in cases where the vehicle computer 84 actually comprises a plurality of devices, the vehicle communication network 86 may be used for communications between devices represented as the vehicle computer 84 in this disclosure. Further, as mentioned below, various controllers and/or sensors may provide data to the vehicle computer 84 via the vehicle communication network 86.

The vehicle 10 may include at least one impact sensor 88 for sensing certain vehicle impacts (e.g., impacts of a certain magnitude, direction, etc.), and a vehicle computer 84 in communication with the impact sensor 88 and the inflator 52. The vehicle computer 84 may activate the inflator 52, e.g., provide an impulse to a pyrotechnic charge of the inflator 52 when the impact sensor 88 senses certain vehicle impacts. The impact sensor 88 may be configured to sense certain vehicle impacts prior to impact, i.e., pre-impact sensing. The impact sensor 88 may be in communication with the vehicle computer 84. The impact sensor 88 is configured to detect certain vehicle impacts. In other words, a "certain vehicle impact" is an impact of the type and/or magnitude for which inflating the airbag 14 is designed i.e., "certain" indicates the type and/or magnitude of the impact. The type and/or magnitude of such "certain vehicle impacts" may be prestored in the vehicle computer 84, e.g., a restraints control module and/or a body control module. The impact sensor 88 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 88 may be located at numerous points in or on the vehicle 10.

The vehicle computer 84 may be in communication with the inflator 52, the pyrotechnic retractor 78, and the impact sensors 88. In the event of certain vehicle impacts, the impact sensors 88 may indicate the vehicle impact and the airbag 14 and the inflatable device 20 are inflated by the inflator 52. The pyrotechnic retractor 78 moves the distal end 18 of the airbag 14 downwardly from the roof until the airbag 14 reaches the inflated position.

The disclosure has been described in an illustrative manner, and it is to be understood that the terminology which has been used is intended to be in the nature of words of description rather than of limitation. The numerical adverbs "first" and "second" are used herein merely as identifiers and do not signify order or importance. Many modifications and variations of the present disclosure are possible in light of the above teachings, and the disclosure may be practiced otherwise than as specifically described.

What is claimed is:

1. A vehicle comprising:
a vehicle roof;
an airbag supported by the vehicle roof, the airbag being inflatable to an inflated position;
the airbag defining an inflation chamber in the inflated position;
the airbag including a distal end below the vehicle roof in the inflated position; and
an inflatable device supported by the vehicle roof, the inflatable device being a thermoplastic elastomer and inflatable to an inflated position;
the inflatable device being in the inflation chamber of the airbag when the inflatable device and the airbag are in the inflated positions;
the inflatable device including a distal end in the inflation chamber of the airbag, the distal end of the inflatable device being below the vehicle roof and above the distal end of the airbag in the inflated position; and the inflation chamber of the inflatable device being fluidly isolated from the inflation chamber of the airbag.

2. The vehicle of claim 1, further comprising:
a vehicle body including the vehicle roof; and
a pyrotechnic retractor supported by the vehicle body, the pyrotechnic retractor being operatively coupled to the distal end of the airbag to move the distal end of the airbag downwardly from the vehicle roof.

3. The vehicle of claim 2, wherein the vehicle body includes a vehicle floor and a pillar extending from the vehicle roof to the vehicle floor, the pyrotechnic retractor being supported by the pillar.

4. The vehicle of claim 2, further comprising a tether extending from the pyrotechnic retractor to the distal end of the airbag.

5. The vehicle of claim 1, wherein the distal end of the inflatable device is spaced above the distal end of the airbag.

6. The vehicle of claim 5, wherein the inflation chamber of the airbag extends between the distal end of the inflatable device and the distal end of the airbag.

7. The vehicle of claim 1, wherein the airbag is a woven fabric.

8. The vehicle of claim 1, further comprising two seats spaced from each other along a vehicle-longitudinal axis, the seats facing each other, and the airbag and the inflatable device being between the seats in the inflated positions.

9. The vehicle of claim 8, wherein each seat defines an occupant seating area, the airbag and the inflatable device being between the occupant seating areas.

10. The vehicle of claim 8, wherein the inflation chamber of the airbag is between the seats and the inflatable device along the vehicle-longitudinal axis in the inflated position.

11. The vehicle of claim 1, wherein the airbag includes a first impact panel and a second impact panel spaced from each other along a vehicle-longitudinal axis, the inflatable device being between the first impact panel and the second impact panel along the vehicle-longitudinal axis in the inflated positions.

12. The vehicle of claim 11, wherein the inflation chamber of the airbag extends between the first impact panel and the inflatable device and the inflation chamber of the airbag extends between the second impact panel and the inflatable device.

13. The vehicle of claim 11, wherein the first impact panel and the second impact panel are each concave.

14. The vehicle of claim 11, wherein the airbag includes a first side and a second side spaced along a cross-vehicle direction from the first side, the first side and the second side each extending from the first impact panel to the second impact panel.

15. The vehicle of claim 14, wherein the inflatable device extends along the cross-vehicle direction between the first side and the second side.

16. The vehicle of claim 11, wherein the inflatable device is spaced from the first impact panel along the vehicle-longitudinal axis and the inflatable device is spaced from the second impact panel along the vehicle-longitudinal axis when the inflatable device and the airbag are in the inflated positions.

17. The vehicle of claim 1, wherein the inflation chamber of the airbag is between the distal end of the airbag and the distal end of the inflatable device.

18. The vehicle of claim 1, wherein the inflation chamber of the airbag is between the inflatable device and the airbag.

19. A vehicle comprising:
a vehicle roof;
an airbag supported by the vehicle roof, the airbag being inflatable to an inflated position;
the airbag defining an inflation chamber in the inflated position;
the airbag including a distal end below the vehicle roof in the inflated position; and
an inflatable device supported by the vehicle roof, the inflatable device being a thermoplastic elastomer and inflatable to an inflated position;
the airbag being a woven fabric, and the inflatable device including walls that are solid;
the inflatable device being in the inflation chamber of the airbag when the inflatable device and the airbag are in the inflated positions so that the inflatable device acts as a reaction surface for the airbag in the inflated positions; and
the inflatable device including a distal end in the inflation chamber of the airbag, the distal end of the inflatable device being below the vehicle roof and above the distal end of the airbag in the inflated position.

* * * * *